United States Patent
Akebono

(10) Patent No.: US 9,109,698 B2
(45) Date of Patent: Aug. 18, 2015

(54) AUTOMATIC TRANSMISSION AND SELECT OPERATION DETERMINATION METHOD FOR AUTOMATIC TRANSMISSION

(71) Applicants: JATCO LTD, Fuji-shi, Shizuoka (JP); NISSAN MOTOR CO., LTD., Yokohama-shi, Kanagawa (JP)

(72) Inventor: Hiromichi Akebono, Phoenix, AZ (US)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/359,025

(22) PCT Filed: Oct. 4, 2012

(86) PCT No.: PCT/JP2012/075764
§ 371 (c)(1),
(2) Date: May 16, 2014

(87) PCT Pub. No.: WO2013/073306
PCT Pub. Date: May 23, 2013

(65) Prior Publication Data
US 2014/0324304 A1     Oct. 30, 2014

(30) Foreign Application Priority Data
Nov. 17, 2011   (JP) ................. 2011-251906

(51) Int. Cl.
*F16H 61/68* (2006.01)
*F16H 61/02* (2006.01)
*F16H 61/04* (2006.01)

(52) U.S. Cl.
CPC ............. *F16H 61/68* (2013.01); *F16H 61/02* (2013.01); *F16H 61/04* (2013.01)

(58) Field of Classification Search
CPC .......... F16H 61/02; F16H 61/04; F16H 61/68
See application file for complete search history.

(56) References Cited

U.S. PATENT DOCUMENTS

| 5,655,993 | A | * | 8/1997 | Fujimoto et al. | 477/116 |
| 5,733,220 | A | * | 3/1998 | Iizuka | 477/116 |
| 5,797,821 | A | | 8/1998 | Fujimoto et al. | |
| 2004/0127320 | A1 | * | 7/2004 | Inoue et al. | 475/210 |

FOREIGN PATENT DOCUMENTS

| JP | 05-054865 U | 7/1993 |
| JP | 08-200487 A | 8/1996 |
| JP | 08-277922 A | 10/1996 |
| JP | 09-004706 A | 1/1997 |
| JP | 09-292012 A | 11/1997 |
| JP | 10-078117 A | 3/1998 |
| JP | 11-037273 A | 2/1999 |

OTHER PUBLICATIONS

JPH1137273(A) (machine translation)—Murakami Kuniaki (Feb. 12, 1999).*

* cited by examiner

*Primary Examiner* — Erin D Bishop
*Assistant Examiner* — Tinh Dang
(74) *Attorney, Agent, or Firm* — Foley & Lardner LLP

(57) ABSTRACT

A transmission controller determines that a select operation has been performed from a reverse range to a drive range if a time during which a range other than the drive range has been selected is longer than a predetermined time threshold value and an input rotation speed of a transmission is lower than a predetermined rotation speed threshold value and determines that the select operation has been performed from a parking range or a neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

9 Claims, 4 Drawing Sheets

AUTOMATIC TRANSMISSION AND SELECT OPERATION DETERMINATION METHOD FOR AUTOMATIC TRANSMISSION

TECHNICAL FIELD

The present invention relates to a technique for determining a select operation in an automatic transmission.

BACKGROUND ART

From which range to which range a select lever of an automatic transmission has been operated, i.e. what select operation has been performed is generally determined based on a change in an ON/OFF state of a switch provided for each range.

For example, in JP11-3273A, it is determined that a select operation from a reverse range to a drive range has been performed if a reverse range switch is switched OFF from ON and a neutral range switch is switched OFF from ON.

If the select operation from the reverse range to the drive range is performed in a short time, a reverse frictional engagement element fails to be released in time and a transmission is interlocked to cause a shock if a forward frictional engagement element is immediately engaged. To avoid this, a control is executed to delay the engagement of the forward frictional engagement element.

SUMMARY OF INVENTION

Since the reverse frictional engagement element is not engaged in a parking range, if an operation is performed from the parking range to the drive range, there is no possibility that the transmission is interlocked to cause a shock even if the forward frictional engagement element is immediately engaged. Specifically, it is not necessary to delay the engagement of the forward frictional engagement element.

However, in the case of the select operation from the parking range to the drive range, the reverse range switch is switched OFF from ON and the neutral range switched is switched OFF from ON as in the case of the select operation from the reverse range to the drive range. Thus, if this is erroneously determined to be the select operation from the reverse range to the drive range, the engagement of the forward frictional engagement element is delayed, thereby causing a delay in switching to the drive range (select lag). The select lag is unfavorable since it deteriorates start responsiveness of a vehicle.

The present invention was developed in view of such a technical problem and aims to enable the determination of a select operation with high accuracy.

According to one aspect of the present invention, an automatic transmission is provided which includes a forward frictional engagement element to be engaged during forward drive and to be released during reverse drive, a reverse frictional engagement element to be engaged during reverse drive and to be released during forward drive, an inhibitor switch including a moving member which moves to each of range positions of a parking range, a reverse range, a neutral range and a drive range by a select operation of a driver and configured to detect the selected range based on the position of the moving member, time measurement means configured to measure a time during which a range other than the drive range has been selected, input rotation speed detection means configured to detect an input rotation speed of the automatic transmission, and select operation determination means configured to determine that the select operation has been performed from the reverse range to the drive range if the time during which the range other than the drive range has been selected is longer than a predetermined time threshold value and the input rotation speed is lower than a predetermined rotation speed threshold value and determine that the select operation has been performed from the parking range or the neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

According to another aspect of the present invention, a select operation determination method is provided for an automatic transmission including a forward frictional engagement element to be engaged during forward drive and to be released during reverse drive, a reverse frictional engagement element to be engaged during reverse drive and to be released during forward drive, and an inhibitor switch including a moving member which moves to each of range positions of a parking range, a reverse range, a neutral range and a drive range by a select operation of a driver and configured to detect the selected range based on the position of the moving member. The select operation determination method includes a time measurement step of measuring a time during which a range other than the drive range has been selected, an input rotation speed detection step of detecting an input rotation speed of the automatic transmission, and a select operation determination step of determining that the select operation has been performed from the reverse range to the drive range if the time during which the range other than the drive range has been selected is longer than a predetermined time threshold value and the input rotation speed is lower than a predetermined rotation speed threshold value and determining that the select operation has been performed from the parking range or the neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

According to these aspects, the select operation can be accurately determined.

An embodiment and advantages of the present invention are described in detail below with reference to the accompanying drawings.

DESCRIPTION OF EMBODIMENT

Figure 1:
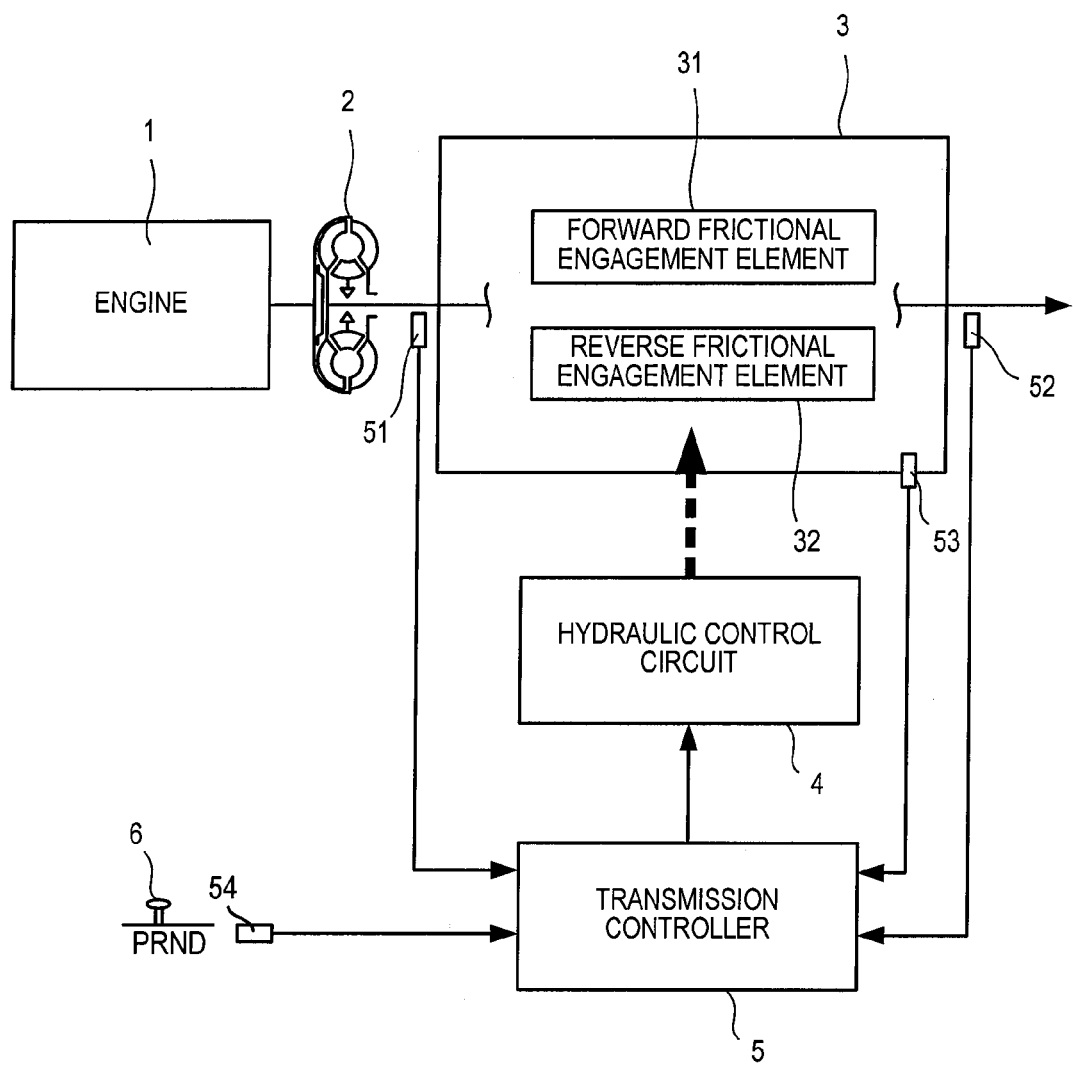
FIG. 1 is a schematic configuration diagram of a vehicle equipped with an automatic transmission according to an embodiment of the present invention.

FIG. 1 shows a schematic configuration of a vehicle equipped with an automatic transmission according to an embodiment of the present invention. The vehicle includes an engine 1, a torque converter 2 and a transmission 3, and output rotation of the engine 1 is transmitted to unillustrated drive wheels via the torque converter 2, the transmission 3 and an unillustrated differential gear unit.

The transmission 3 is a stepped or continuously variable automatic transmission and includes a forward frictional engagement element 31 to be engaged during forward drive and to be released during reverse drive and a reverse frictional engagement element 32 to be engaged during reverse drive and to be released during forward drive.

If the transmission 3 is a planetary gear type stepped transmission configured by a plurality of planetary gears, the forward frictional engagement element 31 and the reverse frictional engagement element 32 are clutches or brakes provided in rotating elements constituting the planetary gears.

If the transmission 3 is a V-belt continuously variable transmission, the forward frictional engagement element 31 and the reverse frictional engagement element 32 are clutches or brakes constituting a forward/reverse switching mechanism provided in a preceding stage of a variator (continuously variable transmission).

In either case, the forward frictional engagement element 31 and the reverse frictional engagement element 32 are engaged or released by a hydraulic pressure supplied from a hydraulic control circuit 4.

The hydraulic control circuit 4 includes a regulator valve for adjusting a hydraulic pressure from an unillustrated hydraulic pump to a line pressure, a solenoid valve for adjusting a hydraulic pressure supplied to frictional engagement elements including the forward frictional engagement element 31 and the reverse frictional engagement element 32 (additionally, constituent elements of the continuously variable mechanism if the transmission 3 is the continuously variable mechanism) using the line pressure as a source pressure, and oil passages connecting the hydraulic pump, each valve and each frictional engagement element.

Each valve of the hydraulic control circuit 4 is controlled based on a control signal from a transmission controller 5. The transmission controller 5 is composed of a CPU, a ROM, a RAM, an input/output interface and the like, determines a running state of the vehicle based on various signals input from various sensors and an engine controller and outputs a shift command signal to the hydraulic control circuit 4 so that a gear position (speed ratio if the transmission 3 is the continuously variable mechanism) suitable for the running state is realized.

To the transmission controller 5 are input signals from a rotation speed sensor 51 for detecting an input rotation speed Nin (turbine rotation speed of the torque converter 2) of the transmission 3, a rotation speed sensor 52 for detecting a vehicle speed VSP ($\propto$ output rotation speed Nout of the transmission 3), an oil temperature sensor 53 for detecting an oil temperature of the transmission 3 and an inhibitor switch 54 for detecting a range selected by a select lever 6. It should be noted that the sensors mentioned here are some of the sensors connected to the transmission controller 5.

The select lever 6 is arranged in gates for connecting a parking range (hereinafter, referred to as a "P-range"), a reverse range (hereinafter, referred to as an "R-range"), a neutral range (hereinafter, referred to as an "N-range") and a drive range (hereinafter, referred to as a "D-range") and configured to be movable between the gates. Each range includes a switch to be turned ON when the select lever 6 is in this range and to be turned OFF when the select lever 6 is not in this range, and the inhibitor switch 54 is composed of a plurality of these switches.

The forward frictional engagement element 31 and the reverse frictional engagement element 32 are engaged or released according to the range selected by the select lever 6.

Specifically, the both frictional engagement elements are released in the P-range and the N-range, only the reverse frictional engagement element 32 is engaged in the R-range and only the forward frictional engagement element 31 is engaged in the D-range.

However, if the select lever 6 is swiftly operated from the R-range to the D-range, the forward frictional engagement element 31 may be possibly engaged before the reverse frictional engagement element 32 is released. If the two frictional engagement elements are simultaneously engaged, the transmission 3 is interlocked to cause a shock.

Accordingly, the transmission controller 5 determines from which range to which range the select lever 6 has been operated (select operation) and executes an engagement delay control to delay the engagement of the forward frictional engagement element 31 if it is determined that the select lever 6 has been operated from the R-range to the D-range.

At this time, if the select operation is determined only based on an output of the inhibitor switch 54, there is a possibility that the select operation cannot be correctly determined since the output of the inhibitor switch 54 when the select lever 6 is operated from the P-range to the D-range is similar to that when the select lever 6 is operated from the R-range to the D-range. If the select operation cannot be correctly determined, the engagement delay control is executed, for example, during the operation from the P-range to the D-range, which does not require the engagement delay control, and this causes the deterioration of start responsiveness of the vehicle.

To avoid this problem, the transmission controller 5 improves accuracy in determining the select operation by considering a time during which the range selected before the selection of the D-range has been selected and the input rotation speed of the transmission 3 during vehicle stop.

Since a correct determination cannot be made even by this method during running (∵ an increase in the input rotation speed of the transmission 3 because the vehicle is in a stopped state and the P-range or the N-range is set and an increase in the input rotation speed of the transmission 3 because the vehicle is running in the R-range cannot be distinguished), a determination is made based on an engaged state of the reverse frictional engagement element 32 (estimated value of a piston stroke ratio Rst) estimated from a hydraulic pressure indicating value to the reverse frictional engagement element 32 in this case.

Figure 2:
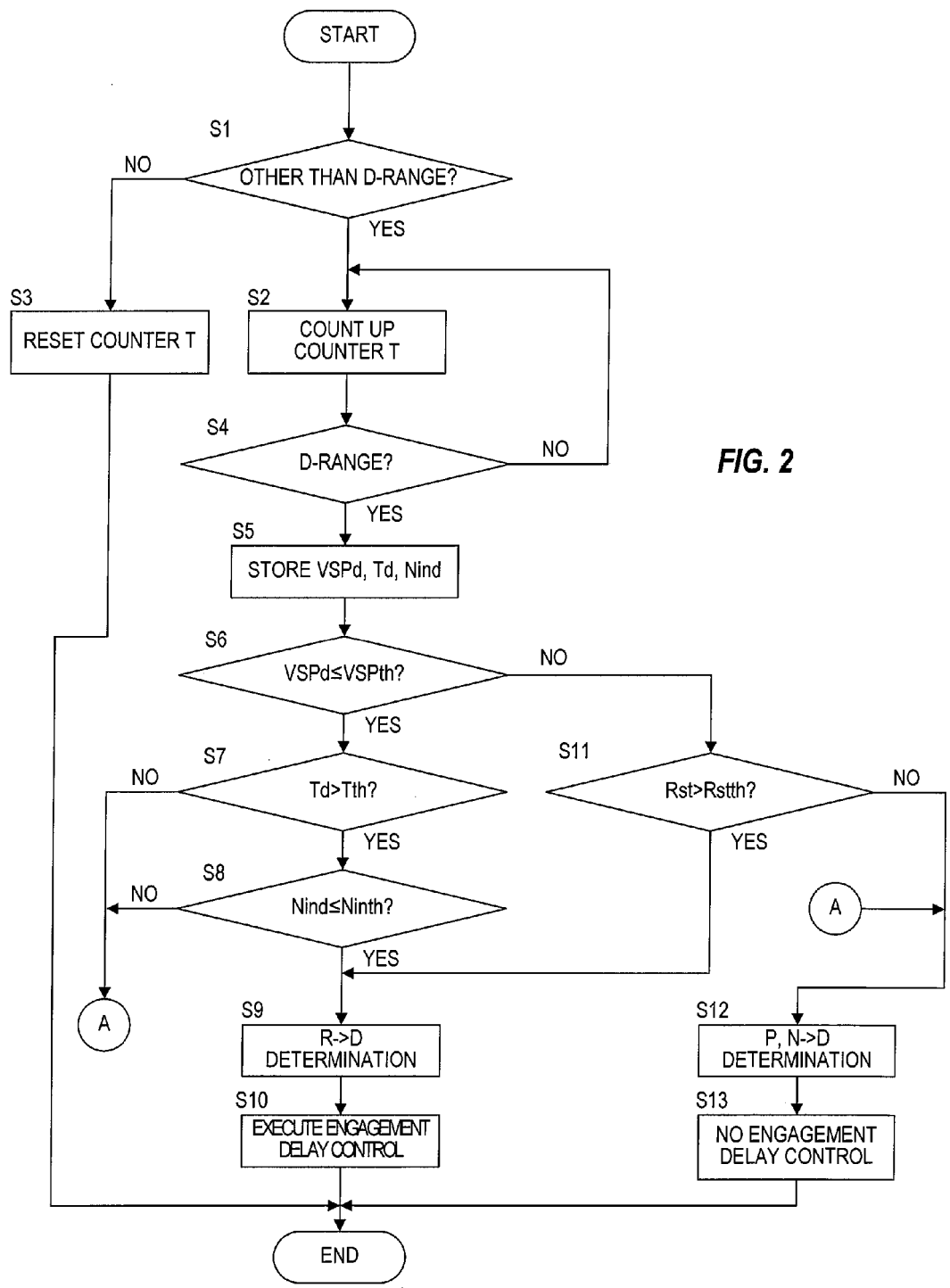
FIG. 2 is a flow chart showing control contents of a transmission controller.

FIG. 2 is a flow chart showing control contents of the transmission controller 5 in the case of a select operation from the range other than the D-range to the D-range. With reference to FIG. 2, the determination of the select operation by the transmission controller 5 and the engagement delay control corresponding to the determination result are described in detail.

Processings of S1 to S4 are processings for measuring a time, during which the range other than the D-range has been selected, when the select lever 6 is operated from the range other than the D-range to the D-range.

First, in S1, the transmission controller 5 determines whether or not the range selected by the select lever 6 is other than the D-range (P-range, R-range or N-range) based on a signal from the inhibitor switch 54.

A process proceeds to S2 if the selected range is other than the D-range and a counter T is counted up. If otherwise, the process proceeds to S3 and the counter T is reset to finish the process.

In S4, the transmission controller 5 determines whether or not the range selected by the select lever 6 is the D-range based on the signal from the inhibitor switch 54. The process proceeds to S5 if the selected range is the D-range, whereas the process returns to S2 to continue the counting of the counter T if otherwise.

The time during which the range other than the D-range has been selected is measured by the counter T in the processings of S1 to S4.

In S5, the transmission controller 5 stores the values of the vehicle speed VSP, the counter T and the input rotation speed Nin when the select lever 6 is operated from the range other than the D-range to the D-range as VSPd, Td and Nind.

In S6, the transmission controller 5 determines whether or not VSPd is not larger than a predetermined vehicle speed threshold value VSPth. The vehicle speed threshold value VSPth is a value at which the vehicle can be determined to be in a stopped state (including a substantially stopped state), e.g. 3 km/h. Such a determination is made to switch a select operation determination method depending on whether the vehicle is stopped or running.

S7 and S8 are processings for determining the select operation during vehicle stop.

In S7, the transmission controller 5 determines whether or not Td is larger than a predetermined time threshold value Tth. The time threshold value Tth is set at a time from the operation of the select lever 6 to the start of the generation of a transmission capacity by the reverse frictional engagement element 32 if it is assumed that the select lever 6 has been operated to the R-range.

If Td is larger than the time threshold value Tth, the process proceeds to S8. If Td is smaller than the time threshold value Tth, the reverse frictional engagement element 32 has generated no transmission capacity even if the range before the operation to the D-range is the R-range. Specifically, a switch to the R-range has not been substantially made yet. Accordingly, in this case, the process proceeds to S12, the transmission controller 5 determines that the select lever 6 has been operated from the P-range or the N-range to the D-range and does not execute the engagement delay control for the forward frictional engagement element 31 (S13).

In S8, the transmission controller 5 determines whether or not Nind is not larger than a predetermined rotation speed threshold value Ninth. The rotation speed threshold value Ninth is set at a predetermined low rotation speed at which the engagement of the reverse frictional engagement element 32 can be determined. If the reverse frictional engagement element 32 is engaged during vehicle stop, the input rotation speed Nin of the transmission 3 is zero. Contrary to this, if the reverse frictional engagement element 32 is released during vehicle stop, the turbine of the torque converter 2 is rotated with the engine 1 and the input rotation speed Nin of the transmission 3 increases. Accordingly, whether or not the reverse frictional engagement element 32 is engaged, i.e. whether or not the range before the select lever 6 is operated to the D-range is the R-range can be determined by determining whether or not Nind is not larger than the rotation speed threshold value Ninth.

The process proceeds to S9 if Nind is not larger than the rotation speed threshold value Ninth. If otherwise, the process proceeds to S12 and the transmission controller 5 determines that the select lever 6 has been operated from the P-range or the N-range to the D-range and prevents the engagement delay control for the forward frictional engagement element 31 (S13).

In S9, the transmission controller 5 determines that the select lever 6 has been operated from the R-range to the D-range.

In S10, the transmission controller 5 executes the engagement delay control for the forward frictional engagement element 31 to avoid a situation where the forward frictional engagement element 31 and the reverse frictional engagement element 32 are simultaneously engaged to interlock the transmission 3.

In the engagement delay control, the transmission controller 5 delays an increasing rate of the hydraulic pressure indicating value of the forward frictional engagement element 31 as compared with the case where the engagement delay control is not executed (S13). The content of the engagement delay control is not limited to this and an increase start timing of the hydraulic pressure indicating value of the forward frictional engagement element 31 may be delayed as compared with the case where the engagement delay control is not executed (S13).

S11 is a processing for determining the select operation during running.

In S11, the transmission controller 5 estimates the engaged state of the reverse frictional engagement element 32 (piston stroke ratio Rst of a piston for causing a friction plate constituting the reverse frictional engagement element 32 to stroke) based on the hydraulic pressure indicating value of the reverse frictional engagement element 32 and determines the select operation based on this.

The piston stroke ratio Rst is a numerical value which indicates the engaged state of the reverse frictional engagement element 32 and is 0% in the released state and 100% in the engaged state (transmission capacity>0), and estimated as follows.

First, the transmission controller 5 obtains a piston stroke speed by referring to a table specifying a relationship between an indicated pressure to the reverse frictional engagement element 32 and the piston stroke speed. Since the piston stroke speed is influenced by the oil temperature of the transmission 3 and tends to increase as the temperature increases, the table is prepared for each oil temperature of the transmission 3.

Subsequently, the transmission controller 5 obtains a piston stroke amount by integrating the obtained piston stroke speed. Then, the transmission controller 5 calculates the piston stroke ratio Rst (estimated value) by dividing the piston stroke amount by a maximum stroke amount.

If the piston stroke ratio Rst (estimated value) is larger than a predetermined stroke ratio threshold value Rstth (=stroke amount at which the reverse frictional engagement element 32 starts generating the transmission capacity), it can be determined that the reverse frictional engagement element 32 is engaged, specifically that the set range before the select lever 6 was operated to the D-range was the R-range, wherefore the process proceeds to S9 in this case. In and after S9, the engagement delay control for the forward frictional engagement element 31 is executed as described above.

If the piston stroke ratio Rst (estimated value) is not larger than the stroke ratio threshold value Rstth, it can be determined that the reverse frictional engagement element 32 is released, specifically that the set range before the select lever 6 was operated to the D-range was the P-range or the N-range, wherefore the process proceeds to S12 in this case. In and after S12, the engagement delay control for the forward frictional engagement element 31 is not executed as described above.

According to the above process, during vehicle stop, the select operation is determined based on the time during which the range selected before the selection of the D-range has been selected and the input rotation speed of the transmission 3. Since this determination method cannot be used during running, the select operation is determined based on the engaged state of the reverse frictional engagement element 32

(estimated value of the piston stroke ratio Rst) estimated from the hydraulic pressure indicating value to the reverse frictional engagement element 32.

Although the select operation determination method based on the piston stroke ratio Rst (estimated value) can be used also during vehicle stop, the piston stroke ratio Rst (estimated value) includes errors such as a variation of an actual pressure for the hydraulic pressure indicating value and a variation of the piston stroke speed for the hydraulic pressure. Since the determination method based on the time during which the range selected before the selection of the D-range has been selected and the input rotation speed of the transmission 3 has higher accuracy, this determination method is used during vehicle stop.

Next, functions and effects of the present embodiment are described.

Figure 3:
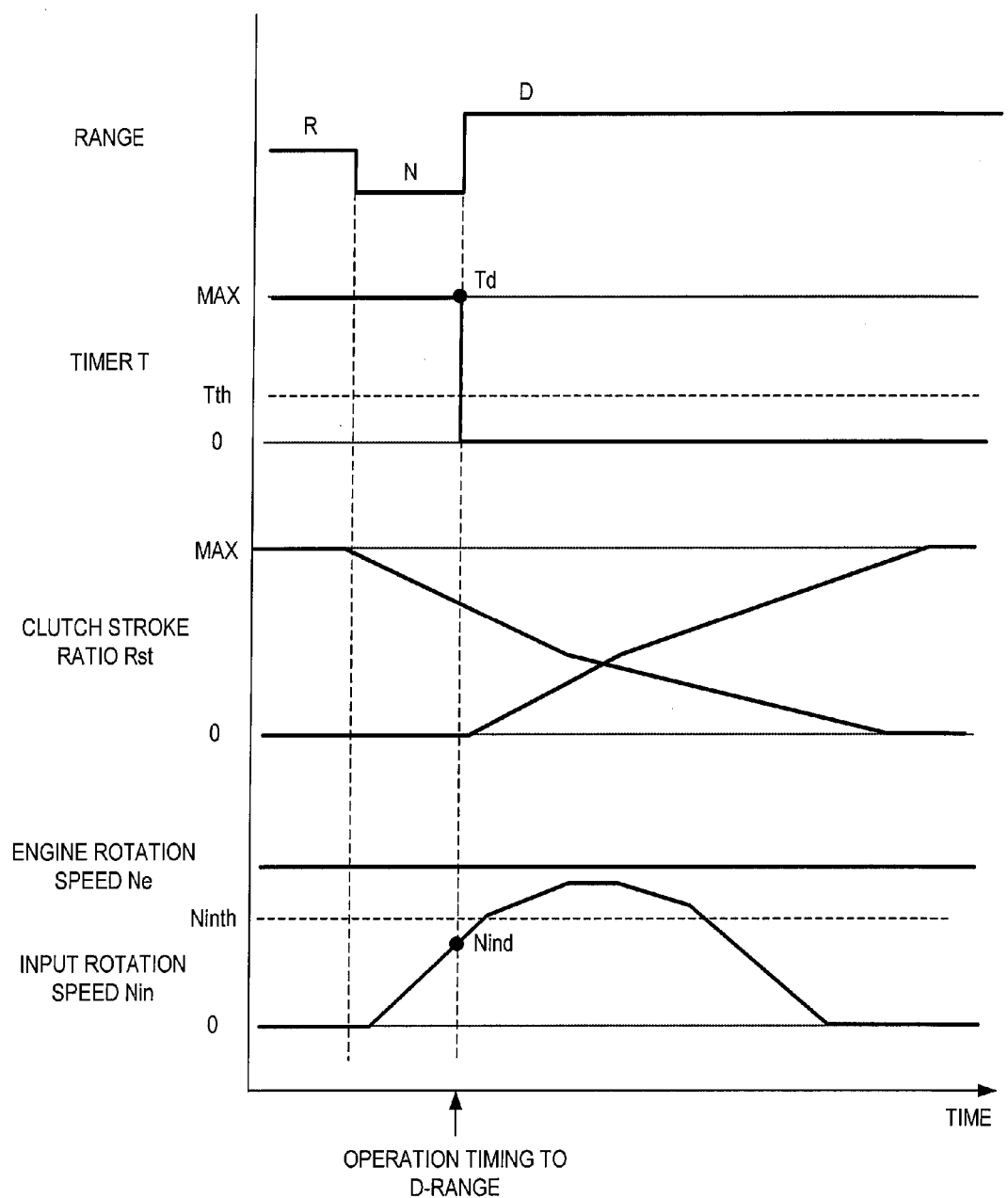
FIG. 3 is a time chart showing functions and effects of the present invention.

FIG. 3 shows a state when the select lever 6 is swiftly operated from the R-range to the D-range by way of the N-range during vehicle stop.

At a timing at which the select lever 6 is operated to the D-range, the value (Td) of the counter T is larger than the time threshold value Tth and the input rotation speed Nin (Nind) is lower than the rotation speed threshold value Ninth. Thus, according to the above process, the select operation from the R-range to the D-range is determined and the engagement delay control for the forward frictional engagement element 31 is executed.

Figure 4:
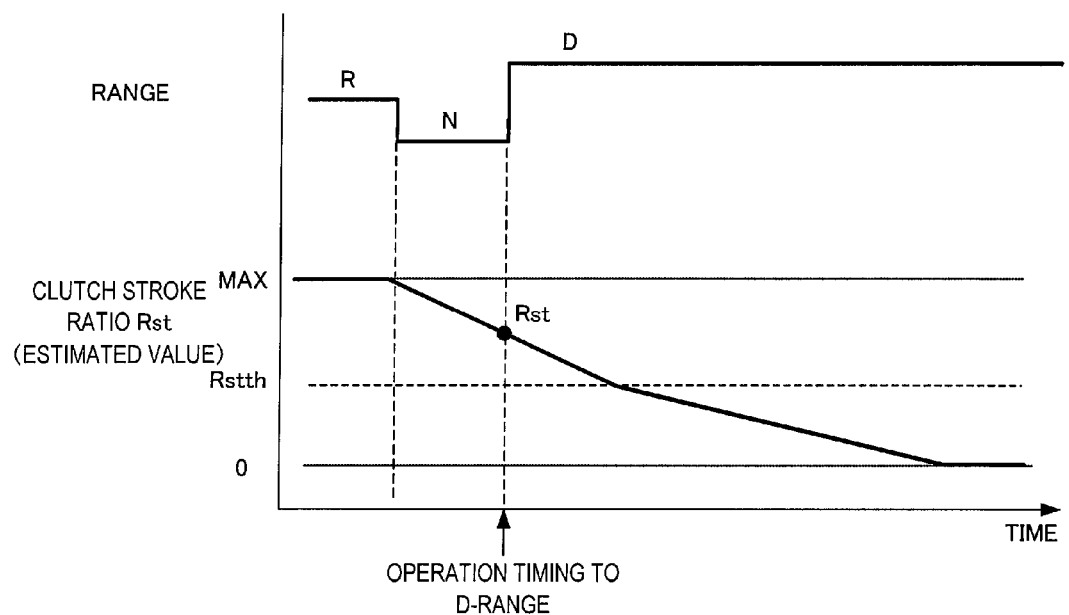
FIG. 4 is a time chart showing functions and effects of the present invention.

FIG. 4 shows a state where the select lever 6 is swiftly operated from the R-range to the D-range by way of the N-range during running.

At a timing at which the select lever 6 is operated to the D-range, the piston stroke ratio Rst (estimated value) is larger than the stroke ratio threshold value Rstth. Thus, the select operation from the R-range to the D-range is determined and the engagement delay control for the forward frictional engagement element 31 is executed.

As just described, according to the present embodiment, the select operation can be precisely determined by being determined based on the time during which the range selected before the selection of the D-range has been selected and the input rotation speed of the transmission 3 during vehicle stop and based on the engaged state of the reverse frictional engagement element 32 (estimated value of the piston stroke ratio Rst) estimated from the hydraulic pressure indicating value to the reverse frictional engagement element 32 during running.

In the case of performing the select operation from the R-range to the D-range, the engagement delay control for the forward frictional engagement element 31 is executed. Thus, a shock caused by the interlocked state of the transmission 3 can be avoided. Further, since the engagement delay control for the forward frictional engagement element 31 is not executed in the select operation from the P-range or N-range to the D-range, the forward frictional engagement element 31 can be quickly engaged and good start responsiveness can be obtained.

Although the embodiment of the present invention has been described above, the above embodiment is merely one application example of the present invention and not intended to limit the technical scope of the present invention to the specific configuration of the above embodiment.

For example, the time threshold value Tth used in the determination of the select operation may be variable according to the oil temperature of the transmission 3 and may be set at a larger value as the oil temperature increases. This is to deal with the fact that the lower the oil temperature, the higher the viscosity and the longer the time required to engage the reverse frictional engagement element 32. This can further improve accuracy in determining the select operation.

Further, the rotation speed threshold value Ninth used in the determination of the select operation may be variable according to the oil temperature of the transmission 3 and may be set at a smaller value as the oil temperature decreases. This is to deal with the fact that the lower the oil temperature, the higher the friction in the transmission 3 and the lower the input rotation speed when the select lever 6 is in the P-range or the N-range during vehicle stop. This can further improve accuracy in determining the select operation.

Further, although the range selected by the select lever 6 is detected by the inhibitor switch 54, the range may be selected by a push button instead of such a lever and a motor may move a movable part of the inhibitor switch 54 according to the selected range, whereby the inhibitor switch 54 may detect the selected range.

This application claims a priority based on Japanese Patent Application No. 2011-251906 filed with the Japan Patent Office on Nov. 17, 2011, all the contents of which are hereby incorporated by reference.

The invention claimed is:

1. An automatic transmission, comprising:
a forward frictional engagement element to be engaged during forward drive and to be released during reverse drive;
a reverse frictional engagement element to be engaged during reverse drive and to be released during forward drive;
an inhibitor switch including a moving member which moves to each of range positions of a parking range, a reverse range, a neutral range and a drive range by a select operation of a driver and configured to detect the selected range based on the position of the moving member;
a time measurement unit configured to measure a time during which a range other than the drive range has been selected;
an input rotation speed detection unit configured to detect an input rotation speed of the automatic transmission; and
a select operation determination unit configured to determine that the select operation has been performed from the reverse range to the drive range if the time during which the range other than the drive range has been selected is longer than a predetermined time threshold value and the input rotation speed is lower than a predetermined rotation speed threshold value and determine that the select operation has been performed from the parking range or the neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

2. The automatic transmission according to claim 1, further comprising an engaged state determination unit configured to determine an engaged state of the reverse frictional engagement element based on a hydraulic pressure indicating value of the reverse frictional engagement element;
wherein the select operation determination unit determines that the select operation has been performed from the reverse range to the drive range if it is determined by the engaged state determination unit that the reverse frictional engagement element is not released and determines that the select operation has been performed from the parking range or the neutral range to the drive range if it is determined by the engaged state determination unit that the reverse frictional engagement element is released when the select operation has been performed from the range other than the drive range to the drive range during running.

3. The automatic transmission according to claim 1, comprising a temperature sensor configured to detect an oil temperature of the automatic transmission;
wherein the select operation determination unit increases the time threshold value as the oil temperature of the automatic transmission decreases.

4. The automatic transmission according to claim 1, comprising a temperature sensor configured to detect an oil temperature of the automatic transmission;
wherein the select operation determination unit decreases the rotation speed threshold value as the oil temperature of the automatic transmission decreases.

5. The automatic transmission according to claim 1, wherein:
the engagement of the forward frictional engagement element is delayed when it is determined that the select operation has been performed from the reverse range to the drive range than when it is determined that the select operation has been performed from the parking range or the neutral range to the drive range.

6. A select operation determination method for an automatic transmission including a forward frictional engagement element to be engaged during forward drive and to be released during reverse drive, a reverse frictional engagement element to be engaged during reverse drive and to be released during forward drive, and an inhibitor switch including a moving member which moves to each of range positions of a parking range, a reverse range, a neutral range and a drive range by a select operation of a driver and configured to detect the selected range based on the position of the moving member, comprising:
a time measurement step of measuring a time during which a range other than the drive range has been selected;
an input rotation speed detection step of detecting an input rotation speed of the automatic transmission; and
a select operation determination step of determining that the select operation has been performed from the reverse range to the drive range if the time during which the range other than the drive range has been selected is longer than a predetermined time threshold value and the input rotation speed is lower than a predetermined rotation speed threshold value and determining that the select operation has been performed from the parking range or the neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

7. The select operation determination method for the automatic transmission according to claim 6, further comprising an engaged state determination step of determining an engaged state of the reverse frictional engagement element based on a hydraulic pressure indicating value of the reverse frictional engagement element;
wherein the select operation determination step determines that the select operation has been performed from the reverse range to the drive range if it is determined by the engaged state determination step that the reverse frictional engagement element is not released and determines that the select operation has been performed from the parking range or the neutral range to the drive range if it is determined by the engaged state determination step that the reverse frictional engagement element is released when the select operation has been performed from the range other than the drive range to the drive range during running.

8. An automatic transmission, comprising:
a forward frictional engagement element to be engaged during forward drive and to be released during reverse drive;
a reverse frictional engagement element to be engaged during reverse drive and to be released during forward drive;
an inhibitor switch including a moving member which moves to each of range positions of a parking range, a reverse range, a neutral range and a drive range by a select operation of a driver and configured to detect the selected range based on the position of the moving member;
time measurement means for measuring a time during which a range other than the drive range has been selected;
input rotation speed detection means for detecting an input rotation speed of the automatic transmission; and
select operation determination means for determining that the select operation has been performed from the reverse range to the drive range if the time during which the range other than the drive range has been selected is longer than a predetermined time threshold value and the input rotation speed is lower than a predetermined rotation speed threshold value and determining that the select operation has been performed from the parking range or the neutral range to the drive range if the time during which the range other than the drive range has been selected is shorter than the time threshold value or the input rotation speed is higher than the rotation speed threshold value when the select operation has been performed from the range other than the drive range to the drive range during vehicle stop.

9. The automatic transmission according to claim 8, further comprising engaged state determination means for determining an engaged state of the reverse frictional engagement element based on a hydraulic pressure indicating value of the reverse frictional engagement element;
wherein the select operation determination means determines that the select operation has been performed from the reverse range to the drive range if it is determined by the engaged state determination means that the reverse frictional engagement element is not released and determines that the select operation has been performed from the parking range or the neutral range to the drive range if it is determined by the engaged state determination means that the reverse frictional engagement element is released when the select operation has been performed from the range other than the drive range to the drive range during running.

* * * * *